(No Model.)
F. H. CARTER.
WIRE STRETCHER.
No. 601,239. Patented Mar. 29, 1898.
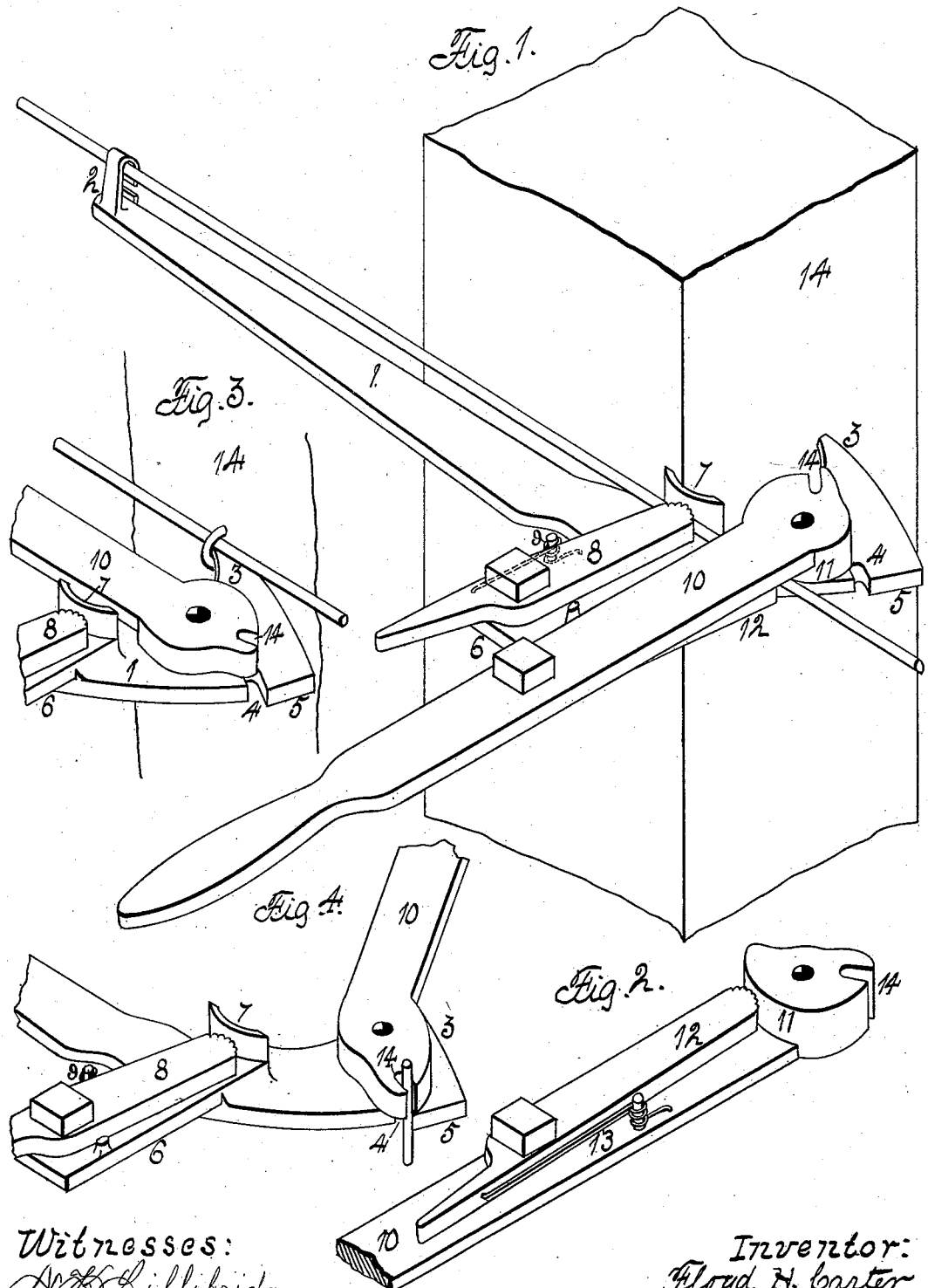
Witnesses:
A. H. Lillibridge
E. Behel
Inventor:
Floyd H. Carter
By A. O. Behel
Atty.

UNITED STATES PATENT OFFICE.

FLOYD H. CARTER, OF BELOIT, WISCONSIN.

WIRE-STRETCHER.

SPECIFICATION forming part of Letters Patent No. 601,239, dated March 29, 1898.

Application filed February 11, 1897. Serial No. 622,925. (No model.)

*To all whom it may concern:*

Be it known that I, FLOYD H. CARTER, a citizen of the United States, residing at Beloit, in the county of Rock and State of Wisconsin, have invented certain new and useful Improvements in Wire-Stretchers, of which the following is a specification.

The object of this invention is to construct a wire-stretcher which will enable the fence-wire to be stapled to the post to which the stretcher is connected.

In the accompanying drawings, Figure 1 is an isometrical representation of my improved wire-stretcher in position for stretching a fence-wire. Fig. 2 is an isometrical representation of the pivoted hand-lever. Fig. 3 is an isometrical representation of my stretcher used as a staple-puller. Fig. 4 is an isometrical representation of the stretcher employed as a wire-cutter.

The shank portion of the stretcher consists of the tapering bar 1, having one end provided with a loop 2 and its other end 3 curved in hook form. A notch 4 is formed in the curved end of the shank, forming a head 5. This bar is bent in the direction of its length, the bend located nearer its curved end. To the upper face of this shank portion, near the curved end thereof, is permanently secured a bracket composed of the main portion 6 and upturned end 7, and to the main portion of the bracket is pivoted a dog 8, operated upon by a spiral spring 9.

To the upper face of the shank portion is pivoted a hand-lever composed of the main portion 10, having its end provided with an offset 11 and a notch 14. To the under face of the main portion of the hand-lever is pivoted a dog 12, operated upon by a spiral spring 13.

In operating the stretcher the looped end of the stretcher is placed upon the wire to be stretched, as shown at Fig. 1, and the pointed end of the stretcher is driven into the post 14. The free wire is placed between the end of the pivoted dog 8 and upturned end 7 and between the dog 12 and offset end 11 of the hand-lever, holding the wire against displacement. By means of the hand-lever the dog carried thereby will impinge upon the fence-wire, and by moving the lever upon its pivotal connection with the main portion of the stretcher the fence-wire will be drawn in its lengthwise direction, and upon taking a new hold upon the wire the dog 8 will impinge upon the wire, thereby holding the wire until the dog of the hand-lever has secured a new hold, when by a movement of the hand-lever the wire is again stretched. The dogs, being spring-operated, will take hold and release the wire at the proper time. After the wire has been sufficiently stretched it may be stapled to the post to which the stretcher is connected, thereby stretching the wire to the corner-post of the fence, and by reason of the bend in the bar 1 the fence-wire will be held some distance above the bar in order that a staple may be placed over the wire and driven into the post.

At Fig. 3 I have shown the stretcher as a staple-puller. The hand-lever is moved upon its pivotal connection with the main portion of the stretcher until parallel with the bar 1, (when the hand of the operator can embrace the lengthwise bar and hand-lever,) the pivotal end 3 is driven within the staple, and the curved head portion acting as a fulcrum the staple can be extracted.

At Fig. 4 the hand-lever is shown so that the notch 14 will coincide with the notch 4, and a wire being placed within the notch will be cut off by the shearing action of the hand-lever.

In this implement are embraced all the necessary tools to set up, repair, or rebuild a wire fence.

I claim as my invention—

A wire-stretcher composed of a main bar having a loop at one end and a hook at its other end, a bracket having an upturned end and extending from the bar, a dog pivotally supported by the bracket, a hand-lever having an enlarged end pivotally supported by the bar, and a dog supported by the hand-lever engaging its enlarged end, the bar bent near its curved end in the direction of its length.

FLOYD H. CARTER.

Witnesses:
E. BEHEL,
A. O. BEHEL.